United States Patent [19]

Kipping

[11] 4,137,869
[45] Feb. 6, 1979

[54] SYSTEM AND METHOD FOR PRODUCTION OF MARINE FOOD USING SUBMERGED PLATFORM

[76] Inventor: Vernon L. Kipping, 540 Melrose Ave., San Francisco, Calif. 94127

[21] Appl. No.: 781,697

[22] Filed: Mar. 28, 1977

[51] Int. Cl.² ............................................. A01K 61/00
[52] U.S. Cl. ............................................ 119/3; 119/4
[58] Field of Search .................................. 119/2, 3, 4

[56] References Cited

U.S. PATENT DOCUMENTS

| | | | |
|---|---|---|---|
| 2,283,472 | 5/1942 | Tuxhorn | 119/3 |
| 3,402,506 | 9/1968 | Renfro | 119/3 X |
| 3,473,509 | 10/1969 | Miyamura | 119/2 |

Primary Examiner—Hugh R. Chamblee
Attorney, Agent, or Firm—Julian Caplan

[57] ABSTRACT

A platform is maintained at a fixed or controlled variable distance below the surface of waters which do not naturally have a substrate suitable for production of marine food; e.g. beyond the continental shelf. Nutrients (e.g. waste biological products) are supplied to the platform, preferably at a controlled rate. The depth of the platform is such that solar energy or other illumination causes the nutrients to reinforce the natural ecosystem, thereby increasing the production of fish which may be harvested as human food.

11 Claims, 7 Drawing Figures

SYSTEM AND METHOD FOR PRODUCTION OF MARINE FOOD USING SUBMERGED PLATFORM

Please refer to Disclosure Document No. 038384 filed Feb. 6, 1975.

This invention relates to a new system and method for the production of marine food and "mariculture." More particularly, the invention relates to the creation of new marine habitats in the form of submerged platforms. The platforms may be fixed, buoyant and anchored, or navigable. The platforms may be situated in oceans, inland seas, lakes or other bodies of water where the aquatic environment would support an increased productivity by providing a suitable substrate. Further, the platforms may be provided with a suitable substrate and eco-system consisting of plants, fauna and nutrients.

One of the underlying problems in the world is lack of food. Although the oceans cover nearly 75% of the surface, only 10% of the oceans are productive and supply less than 4% of the world's food. A major objective of this invention is to increase the productivity of the oceans and other marine bodies through environmental manipulation, e.g. increased productivity through the creation of new habitat. This invention takes advantage of areas where light and nutrients exist but where the substrate is lacking. New niches are provided for rooted algae growth and for small fishes and invertebrates.

A major reason for the current low rate of food productivity of the oceans is its depth, lack of nutrients and substrate. The present invention remedies these defects by providing an artificial habitat in deeper waters where nutrients exist or can be injected in the vicinity to increase the net productivity, hence an increase in foods which can be consumed by humans.

The platforms may consist of a fixed platform mounted on a suitable tower standing on deep water bottoms such that the depth of the platform is within the euphotic zone. Preferably, the platform is supported at a particular depth by means of controllable buoyancy. The buoyancy means may consist of tubes provided with valves to admit controlled amounts of air, inert gas or water, or expel them in order to establish and maintain a desired operating depth. Open bottom flotation chambers may also be used as a buoyancy means. Preferably, each platform is provided with reservoirs of air or inert gas with means to maintain a desired operating depth or to change such depth.

Phytoplankton occupy the upper illuminated regions of the ocean (euphotic zone), higher algae (seaweeds, etc.), which require a substrate, occupy only 1-2% of the vast oceanic area suitably illuminated to permit their growth. A consequence of this is that phytoplankton are responsible for the major part of the primary production (phytosynthesis) occurring in the sea. In fact, the annual rate of net organic production by phytoplankton ($1.2-1.5 \times 10^{10}$ tons of carbon per year) is comparable to that occurring on land and possibly even exceeds terrestrial production by two-fold. Therefore, the ultimate source of food in the sea results from phytoplankton growth, their role being analogous to that of grasses and cereals on land in providing sustenance for herbivores (primarily zooplankton), i.e. phytoplankton are at the base of the marine food chain. (See "The Encyclopedia of Oceanography" by Dr. Rhodes W. Fairbridge, p. 714).

The submerged platforms of the present invention create a new habitat for marine life. In a simplified sense, these platforms are controlled extensions of the continental shelves. At least two types of platform locations may be employed: one, off-continental shelves where nutrients are present from the continental mass. Two, in deep oceans where the platform increases productivity by allowing more phytosynthesis (fixing of carbon) to occur. Nutrients to increase productivity of phytoplankton and zooplankton are introduced onto the platform. One abundant source of nutrient is human waste. However, care must be exercised to eliminate toxic wastes so these will not be re-introduced into the food chain.

Platforms may be situated at varying depths to duplicate a variety of marine conditions to provide optimum conditions for a wide variety of marine life which may be supported by the submarine platform and its environs.

Preferably, each platform is sufficiently large in size so as to be self-supporting and productive and may consist of smaller, independently supported segments which can be removed or added to the whole to facilitate repairs, modifications and maintenance.

Each platform serves as the base to support an ocean area much greater than the physical area of the platform itself. The optimum spacing of platforms is determined on the basis of local conditions in terms of cost and productivity.

One type of platform may be constructed of a suitable base supported by buoyancy tubes. The buoyancy tubes or means may be compartmented for safety in event of an accidental rupture of the buoyancy chambers. Buoyancy tubes are preferably provided with suitable control valves to permit inert gas, air or water to be added or expelled. This provides means for establishing the operating depth, maintaining said depth or establishing a change of depth. Appropriate marker buoys mark the location of each platform. Radio telemetric equipment and associated power means for transmitting data to or from the platform may be mounted on the buoy. This will allow such operations as nutrient injection or change in platform depth and so forth to be remotely controlled.

Each platform is equipped with an appropriate mix of plant, shell, crustacean, fish and other marine life needed to establish a self-sustaining food chain. A vital element is the presence of adequate cover to protect marine life during critical periods. Also, the maximum permissible surface area should be available to support marine life. Cover and increased living area may be provided in various ways, as by junked automobile bodies, old automobile tires or specially designed structures.

A heat source and energy supply means may be utilized to further enhance growth of acquatic life by locating heat source on or in proximity of the platform.

Platforms would be ideal situations for rearing of harvestable marine invertebrates such as lobster, crab, abalone and other shellfish. The isolated nature of a platform could make harvesting of said edible invertebrates quite efficient.

Other objects of the present invention will become apparent upon reading the following specification and referring to the accompanying drawings in which similar characters of reference represent corresponding parts in each of the several views.

Figure 1:
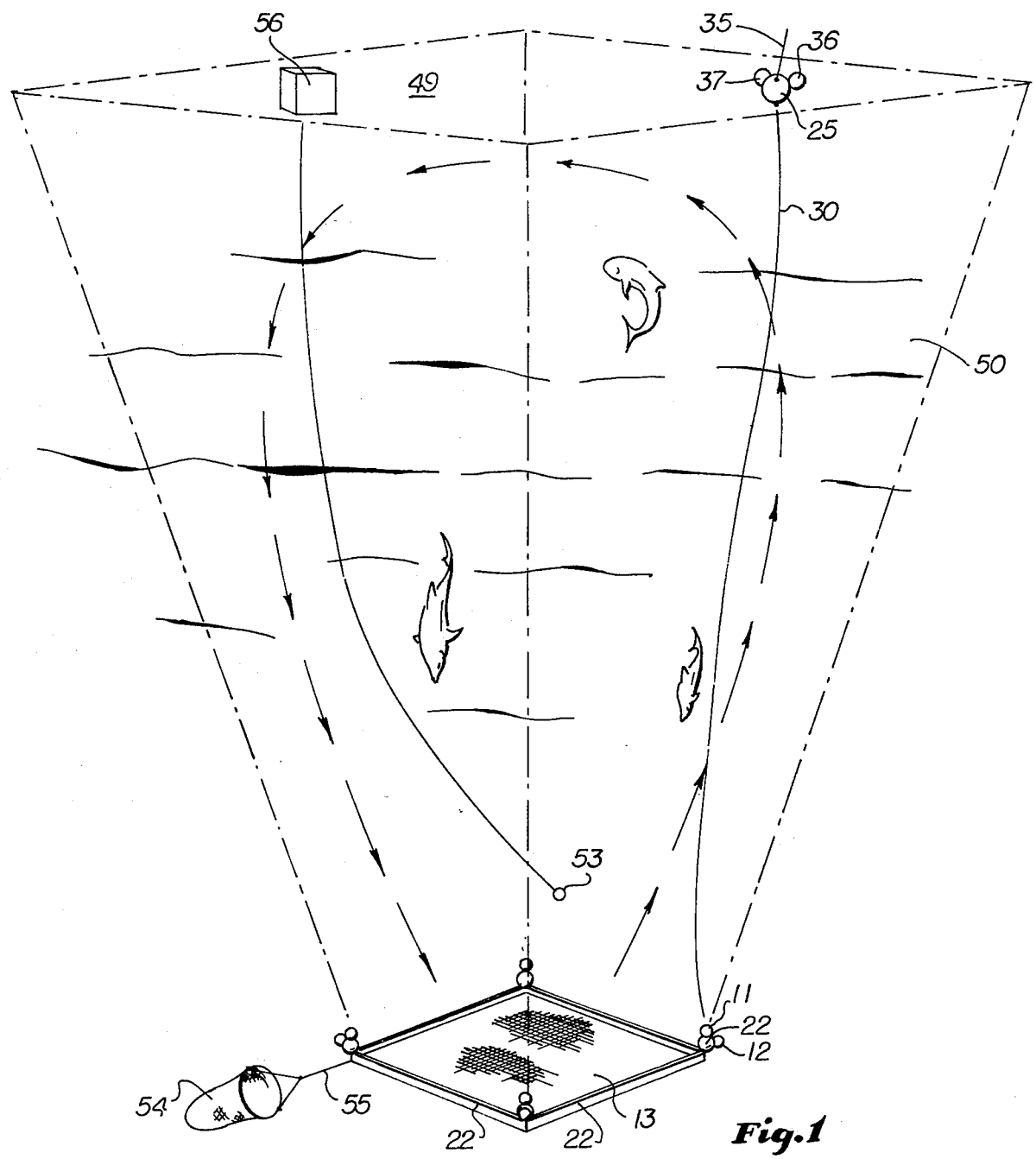
FIG. 1 is a schematic perspective view showing the platform and eco-system of one form of this invention.

Platform 13 is supported by buoyancy tubes 22 preferably covered by a layer of benthic material 39. Platform 13 supports living cover of attached flora and fauna. Increased living area for the flora and fauna may be furnished in form of round tubes 31 and square tubing 33 as well as other suitable cover which may consist of automobile bodies and tires (not shown).

Solar energy from the sun (not shown) strikes surface 49 of water within an ocean area 50 sustained by platform 13. Phytoplankton are found in the surface waters of nearly all the oceans. In combination with a plentiful supply of nutrients phytoplankton flourish and produce a "bloom" with subsequent increases in zooplankton and nekton (which include various fish within its classification.)

By the timely injection of nutrients from reservoir 12 supported in vicinity of platform 13 to reinforce nutrients and carbon which are produced by the eco-system, an increased production of marine life is realized. At the end of this food chain production is man who harvests the edible marine life.

It should be noted that the benthic layer 39 on platform 13 is enriched by organic detrius, bacteria and carbon which are produced by the eco-system depicted in FIG. 1.

DEFINITIONS

Phytoplankton are free floating and drifting plants of the sea.

Zooplankton consists of all animal life forms which are unable to swim effectively against ocean currents.

Nekton includes those animals which are able to swim effectively against horizontal ocean currents.

An artificial light source 53 together with power supply 56, showen schematically, may be situated on platforms placed below the depth where light is not sufficient to support flora and phytoplanakton. The power supply 56 may incorporate solar cells together with storage means (not shown) may be mounted on buoy 25 and power led to light source 53 along anchor buoy, line 30.

A sea anchor 54 secured by anchor line 55 may be positioned in counter-currents and utilized to maintain the relative position of the platform longitudinally and latitudinally. It is understood that while only one sea anchor is shown, any number of sea anchors may be utilized. It is well established that the ocean contains many currents located in vertical layers. A current near the surface might be running from North to South and below it a different current may be run from South to North. Thus, varying currents are encountered and their effect may be offset by utilizing sea anchors to neutralize the relative motion of the under sea platform. In some cases, it may be desirable to allow the platform to drift while monitoring its location via radio telemetery.

Platform 13 may be supported by buoyancy tubes 22 attached thereto. The depth of platform 13 in the water is determined by the proportions of water 18 in buoyancy tube 22 in relation to the air or inert gas 10 and the load on platform 13. Depth control is achieved by means of depth control and valve assembly 14 which releases compressed air or gas from reservoir 11 into buoyancy tube 22 through air line 23. Nutrient is stored in tank 12. Air or inert gas is released from reservoir 11 by control valve means 15 in line 24 causing air or gas to enter nutrient reservoir 12 thereby causing the nutrient stored therein to be expelled through discharge valves (not shown) in storage tank 12.

When it is necessary to raise the platform 13, this may be done by adding more air or gas 10 to buoyancy tube 22 so that water 18 is forced out of the buoyancy tube 22. Addition of more water 18 to buoyancy tube 22 will increase the depth of platform 13. Buoyancy tube 22 is provided with air reservoir 11. Depth valve 14 causes the release of air (or gas) from reservoir 11 by passing air through line 23 into tube 22 causing water 18 to be expelled via valves 17. When depth of the platform 13 is to be increased, this is achieved by opening valves 17 to admit more water into buoyancy tubes 22 while opening valves 16 to permit the discharge of air from tube 22. Nutrient is stored in tank 12 and is released by the opening of control valve 15 causing air to be discharged from tank 11 via line 24 into nutrient tank 12 so that the nutrient stored therein is discharged via discharge valve 51. Buoyancy control means may be provided with a power supply 56 to actuate valves 16, 17, 51, and, controls 14 and 15.

Figure 5:
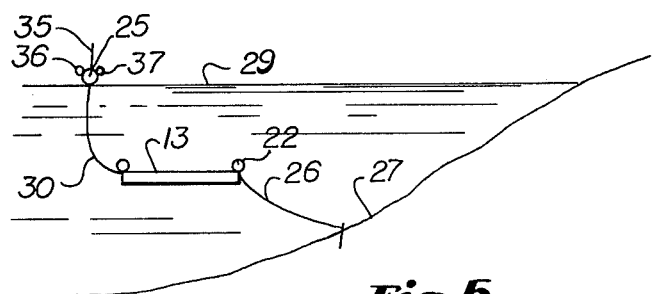
FIG. 5 is a side elevational schematic view of buoyant type platform fixed in position via anchor means.
Figure 6:
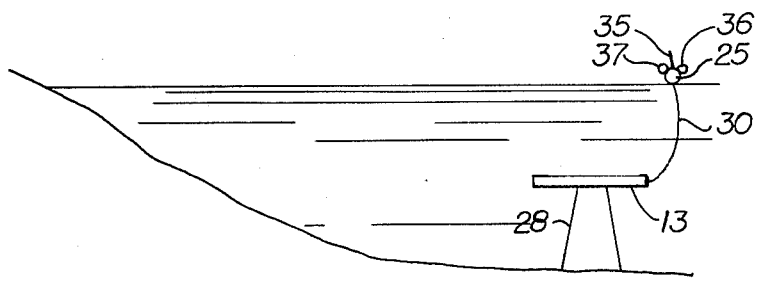
FIG. 6 is a side elevational schematic view of fixed type platform supported by tower.

One means of supporting buoyant platform 13 is shown in FIG. 5. Anchor means 25 is attached to bottom 27 to hold or secure platform 13. Marker buoy 25 floats on the surface of water 29 and is attached to platform 13 by cable 30. Another means of supporting platform 13 in a fixed mode is shown in FIG. 6 where platform 13 is supported by tower 28 which rests on sea bottom 27. Marker buoy 25 floats on surface of water 29 and is attached to platform 13 by cable 30.

Figure 3:
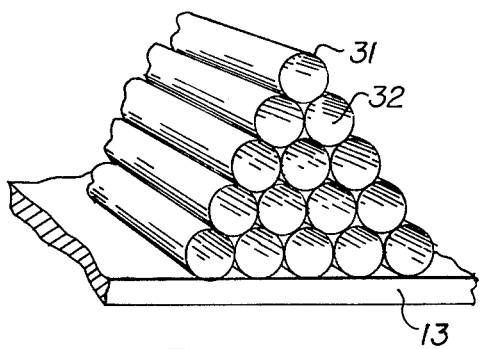
FIG. 3 is a schematic perspective view of round tubing on a platform used to provide cover and increased living area for marine life.
Figure 2:
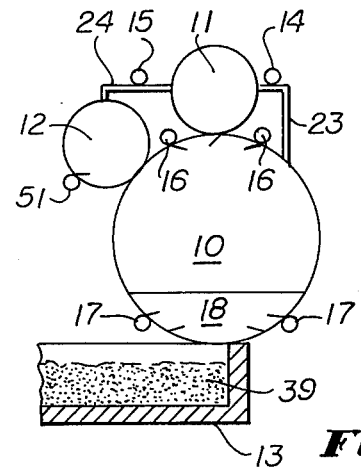
FIG. 2 is an enlarged side elevational view of a portion of the platform partly broken away in section showing buoyancy means, air reservoir, nutrient reservoir and nutrient injection means.
Figure 4:
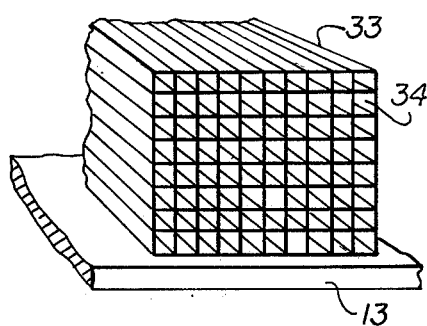
FIG. 4 is a schematic perspective view similar to FIG. 3 showing use of square tubing.
Figure 7:
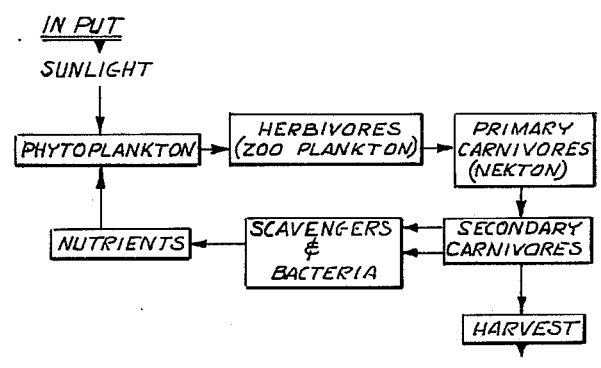
FIG. 7 is a schematic diagram illustrating the method of the present invention.

One type of cover means to provide increased living area and cover for the marine life on platform 13 is shown in FIG. 3. Circular tubes 31 are stacked on platform 13 to provide an increase in available cover and living area in the interiors 32 of tubes 31. FIG. 4 shows a variation of cover shown in FIG. 3. Here additional living area and cover is furnished in the interiors 34 of square tubes 33 which are supported by platform 13.

Telemetric radio transceiver 36, power supply 37 and antenna 35 may be provided on buoy 25. This equipment facilitates the transmittal and reception of information concerning the weather, wave conditions, temperatures, status of the platform and the like. It also provides means for remotely causing the platform 13 to be raised or lowered and for the injection of nutrients in the vicinity by control of valves 14–17. Information to and from the platform 13 via telemetry is carried along cable 30 which attaches marker buoy 25 to platform 13.

What is claimed is:

1. A system for production of marine food comprising an open platform containing materials to support flora and fauna, first means located totally below the surface of the water for maintaining said platform submerged at a selected depth in an open body of water within the euphotic zone so that said platform is not subjected to wave action on the surface, and second means for supplying nutrients to said platform over an extended period of time, whereby the occurrence of phytoplankton and plankton in the vicinity of said platform is increased and bloom of zooplankton is increased.

2. A system according to claim 1 in which said first means is a tower supporting said platform extending from the bottom of said body of water.

3. A system according to claim 1 in which said first means comprises buoyancy tank attached to said platform, a source of compressed gas, first valve means for admitting said compressed gas to said tank and second valve means controlling water admission to and discharge from said tank.

4. A system according to claim 3 which further comprises third means responsive to a signal from a remote source to control said second means and said first and second valve means, fourth means to transmit to said source data as to at least some of the conditions existing at said platform, said conditions comprising weather, water temperature, water turbulence, extent of marine life and the location of said platform.

5. A system according to claim 1 in which said materials comprise benthic materials.

6. A system according to claim 1 which further comprises hollow structures on said platform.

7. A system according to claim 1 which further comprises means for artificial illumination of the area above said platform and a power source for said last-named means.

8. A method for increasing the production of fish and aquatic life in an area where water depth, lack of natural nutrients or the condition of the substrate inhibits natural production of plant life and fauna comprising providing an open platform habitat suitable for growth of plants and animals, locating said platform in an open body of water at a pre-selected depth in the euphotic zone of said water in said area, said platform being totally below the surface and not subject to disturbance by wave action on the surface, and providing controlled quantities of nutrients to said platform over a prolonged period of time.

9. A method according to claim 8 in which said platform is anchored beyond the continental shelf.

10. A method according to claim 8 in which said platform is supported by buoyancy means comprising a tank containing water and compressed gas and in which said method comprises controlling by remote radio control the admission to and discharge from said tank of compressed gas and water and the rate of providing nutrients to said platform.

11. A method according to claim 8 which further comprises artifically illuminating the water above said platform.

* * * * *